March 3, 1959 H. MESROBIAN 2,875,870
DEVICE FOR UNIFYING THE CONTROLS OF THE BRAKE AND THE
ACCELERATOR AND THE CLUTCH IN MOTOR VEHICLES
Filed June 11, 1956

INVENTOR
HRANT MESROBIAN

United States Patent Office 2,875,870
Patented Mar. 3, 1959

2,875,870

DEVICE FOR UNIFYING THE CONTROLS OF THE BRAKE AND THE ACCELERATOR AND THE CLUTCH IN MOTOR VEHICLES

Hrant Mesrobian, Buenos Aires, Argentina

Application June 11, 1956, Serial No. 590,761

5 Claims. (Cl. 192—.094)

The present invention refers to a novel device intended to be applied to motor vehicles in general and which has for its object the unification of the controls of the accelerator, the brake and the clutch of such motor vehicles so that one and the same lever or pedal as it is pressed down by the heel or the whole foot of an operator, positively actuates the accelerator or slows it down and, at the same time, brings about the braking and coupling of the motor vehicle.

Up to the present, in motor vehicles in general the accelerator, the clutch and the brake, in spite of their intimate relationship with regard to the operation of the vehicle, constituted independent controls, and in order to actuate either of them, it was necessary to lift the foot from the other. Therefore, a lot of accidents happened which could have been avoided, because the driver, becoming confused in face of danger, pressed down the accelerator in place of applying the brake, thus obtaining an effect completely contrary to the desired one. In other cases, on abruptly applying the brake owing to any contingency of circulation, the driver has not enough time to actuate the clutch causing damage to the motor of the vehicle.

In accordance with the present invention the driver of a motor vehicle in which the device is incorporated is relieved of the necessity of frequently changing his feet from one position to another, particularly when driving through heavy traffic areas where he is often obliged, on reaching a street crossing, to release the accelerator and press down the clutch and the brake, all of which is eliminated by using the present device. In this invention, the same pedal on being pressed down by the heel only or by the whole foot either accelerates or couples and brakes the vehicle so that the operations as mentioned are limited to mere movements of the foot.

The accelerating and braking mechanism by itself is easy to construct and consists of an ingenious combination of pivoted levers and springs so that its cost is low and its use definitely advantageous if the ease it affords and the security it offers the driver for handling emergency situations are taken into account. The automatic coupling mechanism comprises a mechanical transmission means, such as a rod, a cable or the like which connects a vacuum circuit, an electric circuit, or a cylinder containing compressed air, to a piston actuating the clutch through the medium of a rotary valve or the like, the rod being attached to the prolongation of the only pedal of the drive in such a manner that the "thrown-out" position of the clutch is reached on completely releasing the pedal in the way as will be described hereinafter.

The device also comprises an additional stop intended to replace the driver's action on the pedal in case of emergency or for convenience, the nature of which stop will be explained hereinafter.

Owing to its features, this device can be applied without any trouble to conventional types of motor vehicles after previously making slight changes in these vehicles which can be taken care of quickly and economically by any specialized workshop.

With the object in mind that this invention may be clearly understood it will now be described in detail with reference to the attached illustrating drawings wherein.

In all these figures the same reference numbers indicate equal or corresponding parts.

Figure 1:
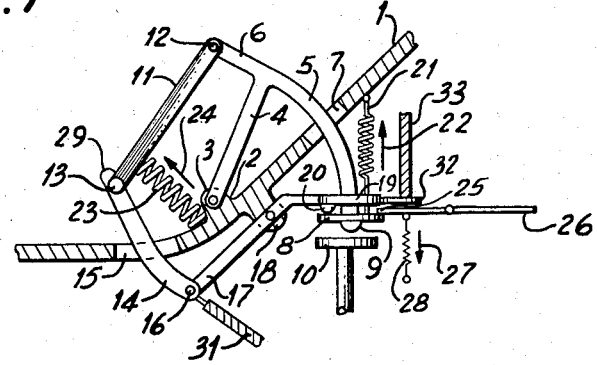
Fig. 1 shows the device according to the present invention in its inoperative position.

In these figures, 1 is the floor of the motor vehicle on which the T lever 4 is hinged at 3 to the support 2; the portion of the lever that is curved has one of its sides —5— larger than the other —6— and penetrates the floor through the opening 7 of same, carrying on its end the enlarged head 8 provided with a wheel 9, capable of contacting the rod 10 of the brake of the vehicle. The end of the other portion 6 of the mentioned lever has hinged to it the foremost part of the pedal 11 of the brake hinged to the accelerator by means of this mechanism which unifies both controls. The joint on the pedal is indicated by 12, the other end of the pedal also being pivoted at 13 to an intermediate piece 14 which extends through an opening of the floor of the motor vehicle at 15 and links up at 16 with a lever 17 which oscillates around the support 18 and terminates in the fork 19 whose stop 20 rests normally on the top of the enlarged head 8 to which is also attached one of the ends of the spring 21 which works in the sense as illustrated by the arrow 22. Another spring 23, properly arranged, works, on its part, in the sense of the arrow 24, that is to say, normally spacing the pedal from the floor in order to maintain it at its inoperative position. There also rests on head 8 the end 25 of the rod 26 of the accelerator on which rod works the spring 28 in the sense indicated by the arrow 27. In order that the mechanism may be fully understood, the dimensions of the springs are formed in accordance with their respective powers, i. e., the spring 23 is more powerful than spring 21 and the latter, is more powerful than spring 28.

Figure 2:
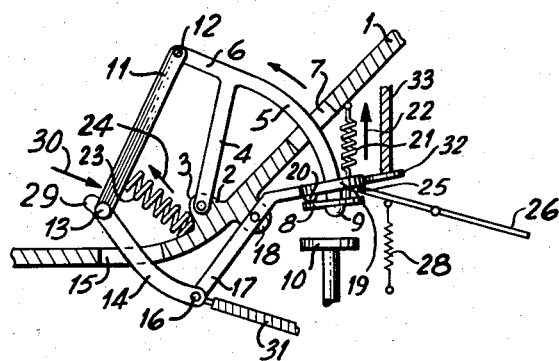
Fig. 2 shows the same device in acceleration position.
Figure 3:
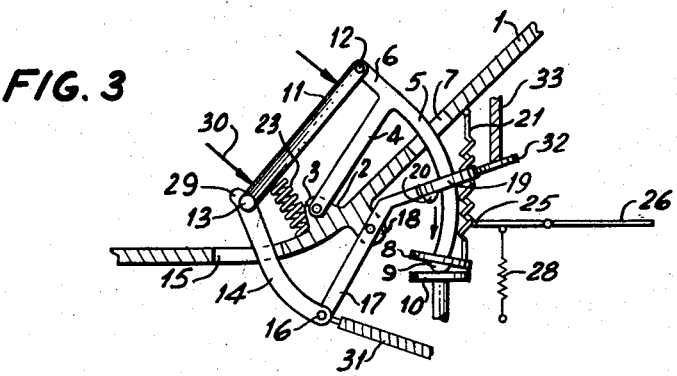
Fig. 3 shows the mechanism in braking position.

The operation of the device takes place as follows: as the pedal 11 is provided in the area of the heel with a protruding portion 29 so that the driver's heel may rest on it, if the driver wishes to accelerate the vehicle, he presses said pedal with his heel only, as shown by the arrow 30 in Fig. 2; said pressure overcomes the resistance offered by the spring 23 and causes the intermediate piece 14 to descend thus transmitting the movement to the oscillating lever 17 on which the fork 19 rises and ceases to press down the head 8 which, released, tends to rise, drawn by the spring 21, to the same extent as the rising of the fork permits, and when said head rises, as the spring 21 is more powerful than the spring 28 which holds the rod of the accelerator, it determines the displacement of the rod, the acceleration of the vehicle thus being achieved fully in accordance with what is shown in Fig. 2.

If it is desired to put on the brake when driving at accelerated speed, it will be sufficient to press the lever or pedal 11 with the whole foot, or cause the foremost part thereof to descend in which case, even if the fork 19 is raised, head 8 descends when the piece 4 turns around the pivot 3, overcoming the resistance of the spring 21, and said head presses down the rod 10 of the brake. At the same time, when the head 8 descends, the supporting of the end of the rod 26 of the accelerator ceases automatically, the latter returning to its original position of slow drive. It is to be understood that at some point in any braking operation the heel must be released in order to disengage the clutch.

As will be clearly appreciated from the foregoing, if the vehicle is to be driven at an accelerated speed, the pedals should be pressed down with the heel only, and if it is desired to apply the brake, the pressure should be exercised with the whole foot or the tip thereof, so that the same effect is obtained and the risk avoided of erroneously pressing down the accelerator in place of the brake in an emergency situation, a risk which could never be avoided.

This mechanism can be completed by automatic control of the clutch which can be achieved by means of, for instance, a piston or similar which is operated by the air of a fluid, compressed air or any other currents means, this control being put into operation through a suitable valve worked by the cable 31 united to the joint 16. When the pedal is completely released, it rises by the action of the spring 23 and draws the cable which works the valve, and the device employed thus takes the clutch gradually and automatically to the "thrown-out" position.

Likewise, the mechanism is provided with an additional stop intended to replace the driver's action on the pedal in case of emergency or for convenience. To this effect, a cable 33 (or a suitable spring) is linked up to the protruding portion 32 of the fork 19, which cable will be actuated by hand from the switchboard of the motor vehicle and by which said fork can be displaced overcoming the spring 23. The particularity of this stop consists in that it does not in any way limit the possibilities of accelerating or braking the vehicle instantaneously, for it is sufficient to step on the pedal with the heel of the whole foot to obtain respectively the acceleration, and the braking of the vehicle.

Various changes and modifications may be made without departing from the spirit and scope of the present invention and it is intended that such obvious changes and modifications be embraced by the annexed claims.

Having thus described the invention, what is claimed as new and desired to be secured by Letters Patent is:

1. A single control unit for use in connection with an automotive vehicle to operate the accelerator, brake and clutch thereof, comprising a support forming floor wall provided with first and second fulcrums located at opposite faces of said floor wall and with spaced apart openings, a substantially T-shaped first member having its web part pivoted at said first fulcrum of said floor wall, the traverse part of said T-shaped member including a substantially curved portion passing through one of said openings and terminating in an enlarged end, a second member having two ends, the other end of said traverse part being pivoted to one of said ends of said second member, a third member pivoted to the other end of said second member and extending through the other opening in said floor wall and terminating in a jointed end, a double-armed lever pivotally supported by said second fulcrum and terminating in a bifurcated end above said enlarged end of said curved portion, whereby said curved portion may pass through said bifurcated end for abutment of said enlarged end against said brake, an accelerator lever located between said bifurcated end and said enlarged end and actuable therebetween from an inoperative position to an operative position of said accelerator, said double-armed lever being further provided with an end forming part of said jointed end of said third member, a cable operatively connected to said third member for operating said clutch, and respective spring means biasing said bifurcated end and said second member relative to said floor wall, and for acting on said accelerator lever to normally maintain same in inoperative position with respect to said accelerator.

2. A single control unit for use in connection with an automotive vehicle to operate the accelerator, brake and clutch thereof, comprising a support forming floor wall provided with first and second fulcrums located at opposite faces of said floor wall and with spaced apart openings at opposite sides of said fulcrums, a substantially T-shaped first lever pivoted to said first fulcrum of said floor wall and including a substantially curved arm passing through one of said openings and terminating in an abutment, a second lever forming a pedal and having two ends, the other end of said arm being pivoted to one of said ends of said second lever, a third lever pivotally connected to the other end of said second lever and extending through the other opening in said floor wall to terminate in a jointed end, a double-armed lever pivotally supported by said second fulcrum and terminating in a bifurcated end above said abutment, whereby said curved arm upon pressure exerted against said second lever may be moved through said bifurcated end for contact of said abutment with said brake, an accelerator lever located between said bifurcated end and said abutment and actuable therebetween from one position to another position to operate said accelerator, said double-armed lever being further provided with an end connected to said jointed end of said third lever, an element operatively connected to said third lever for operating said clutch, respective first and second spring means biasing said bifurcated end and said second member relative to said floor wall, and third spring means for acting on said accelerator lever to normally maintain same in one of said positions with respect to said accelerator.

3. A control unit according to claim 2, including means connected to said bifurcated end, to operate the latter and its double-armed lever independently of said pedal forming second lever and against said first spring means biasing said bifurcated end relative to said floor wall.

4. A control unit according to claim 2, wherein said third lever at the end connected to said second lever forms a support for the heel of the shoe of an operator, while the pivot connection between said second lever and said first lever forms an abutment for the tip of the shoe of said operator.

5. A control unit according to claim 2, wherein said first spring means is relatively stronger than said second spring means, whereas said third spring means is relatively weaker than said first and second spring means.

References Cited in the file of this patent

UNITED STATES PATENTS

| | | |
|---|---|---|
| 1,444,027 | Frederick et al. | Feb. 6, 1923 |
| 2,063,793 | Cook | Dec. 8, 1936 |